United States Patent
Yamatsuta

(10) Patent No.: US 12,489,967 B2
(45) Date of Patent: Dec. 2, 2025

(54) IMAGE PROCESSING APPARATUS AND METHOD

(71) Applicant: SONY GROUP CORPORATION, Tokyo (JP)

(72) Inventor: Yoshinori Yamatsuta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 81 days.

(21) Appl. No.: 18/546,295

(22) PCT Filed: Jan. 12, 2022

(86) PCT No.: PCT/JP2022/000717
§ 371 (c)(1),
(2) Date: Aug. 14, 2023

(87) PCT Pub. No.: WO2022/181087
PCT Pub. Date: Sep. 1, 2022

(65) Prior Publication Data
US 2024/0121503 A1     Apr. 11, 2024

(30) Foreign Application Priority Data
Feb. 25, 2021  (JP) .................................. 2021-028238

(51) Int. Cl.
*H04N 23/63* (2023.01)
*H04N 5/92* (2006.01)
*H04N 23/951* (2023.01)

(52) U.S. Cl.
CPC ............. *H04N 23/632* (2023.01); *H04N 5/92* (2013.01); *H04N 23/951* (2023.01)

(58) Field of Classification Search
CPC ............. H04N 23/632; H04N 23/6812; H04N 23/683; H04N 23/951; H04N 5/77; H04N 5/92
See application file for complete search history.

(56) References Cited

U.S. PATENT DOCUMENTS

| | | | |
|---|---|---|---|
| 6,614,945 B1 * | 9/2003 | Takaoka ................. | H04N 1/387 |
| | | | 382/282 |
| 9,560,244 B2 * | 1/2017 | Abe ....................... | H04N 23/63 |

(Continued)

FOREIGN PATENT DOCUMENTS

| JP | 2003-224760 A | 8/2003 |
|---|---|---|
| JP | 2012-023497 A | 2/2012 |

(Continued)

OTHER PUBLICATIONS

International Search Report and Written Opinion of PCT Application No. PCT/JP2022/000717, issued on Apr. 5, 2022, 09 pages of ISRWO.

*Primary Examiner* — Antoinette T Spinks
(74) *Attorney, Agent, or Firm* — CHIP LAW GROUP

(57) ABSTRACT

Provided is the image processing apparatus includes a control section that selects, in a case in which multiple captured images for recording are continuously captured, whether to cause black out-free live view display for sequentially displaying one of the captured images and one or multiple inter-frame images that are captured between capturing of the captured image and capturing of next captured image and that are not for recording, to be carried out, or cause black out live view display for alternately providing a backout display period in which no image is displayed and a display period in which at least the inter-frame images are sequentially displayed, to be carried out. The present technology can be applied to a camera.

14 Claims, 7 Drawing Sheets

(56) References Cited

U.S. PATENT DOCUMENTS

| | | | | |
|---|---|---|---|---|
| 2015/0022688 A1* | 1/2015 | Shiohara | ................ | H04N 25/53 |
| | | | | 348/229.1 |
| 2015/0146051 A1* | 5/2015 | Abe | ...................... | G03B 19/12 |
| | | | | 348/262 |
| 2017/0230583 A1* | 8/2017 | Kudo | ..................... | H04N 23/71 |
| 2017/0295313 A1* | 10/2017 | Koizumi | ................ | H04N 25/60 |
| 2017/0374288 A1* | 12/2017 | Kino | ...................... | H04N 23/71 |
| 2020/0021739 A1* | 1/2020 | Tanaka | ................. | H04N 25/531 |
| 2021/0168291 A1* | 6/2021 | Tanaka | ..................... | H04N 5/91 |
| 2022/0256108 A1* | 8/2022 | Mikami | ................. | H04N 23/63 |
| 2024/0080411 A1* | 3/2024 | Hatanaka | ............... | H04N 23/62 |
| 2024/0314422 A1* | 9/2024 | Nohara | ................. | H04N 23/63 |
| 2025/0248275 A1* | 7/2025 | Hwang | ................ | H10K 59/873 |

FOREIGN PATENT DOCUMENTS

| | | |
|---|---|---|
| JP | 2013-118463 A | 6/2013 |
| JP | 2017-191996 A | 10/2017 |
| JP | 2018-006827 A | 1/2018 |
| JP | 6565905 B2 | 8/2019 |
| WO | 2018/179711 A1 | 10/2018 |

\* cited by examiner

IMAGE PROCESSING APPARATUS AND METHOD

CROSS REFERENCE TO RELATED APPLICATIONS

This application is a U.S. National Phase of International Patent Application No. PCT/JP2022/000717 filed on Jan. 12, 2022, which claims priority benefit of Japanese Patent Application No. JP 2021-028238 filed in the Japan Patent Office on Feb. 25, 2021. Each of the above-referenced applications is hereby incorporated herein by reference in its entirety.

TECHNICAL FIELD

The present technology relates to image processing apparatus and method, and a program, and particularly to image processing apparatus and method, and a program which enable appropriate live view display.

BACKGROUND ART

For example, there has been proposed a technology (for example, see PTL 1) for reducing, in a case in which a camera is used to capture an image, a length of time from exposure completion to display of a preview image, by outputting an image having a low resolution to an image processing LSI (Large Scale Integration) to carry out image processing before output of an image having a high resolution for recording to the LSI.

When such a technology is used, in a case in which a camera is used to carry out, for example, continuous shooting, continuous live view display can be carried out without an occurrence of black out, that is, an occurrence of a period in which the image is not displayed, even during the continuous shooting.

Such a method for the live view display without the occurrence of the black out is referred to as BOF (Black Out Free) or BOL (Black Out Less) live view display or the like.

Since the BOF live view display is executed in a state in which a subject is always displayed, a user can track the subject without losing the subject even during the continuous shooting, and a more satisfactory image can be acquired.

CITATION LIST

Patent Literature

[PTL 1]
Japanese Patent No. 6565905

SUMMARY

Technical Problem

However, according to the technology described above, the BOF live view display adversely affects depending on a photographing condition (scene) such as continuous shooting with a long second exposure, and there is such a case in which the user has difficulty in tracking a subject.

The present technology has been made in view of the foregoing situation, and the object thereof is to enable execution of appropriate live view display.

Solution to Problem

An image processing apparatus according to one aspect of the present technology includes a control section configured to select, in a case in which multiple captured images for recording are continuously captured, whether to cause black out-free live view display for sequentially displaying one of the captured images and one or multiple inter-frame images that are captured between capturing of the captured image and capturing of next captured image and that are not for recording, to be carried out, or cause black out live view display for alternately providing a backout display period in which no image is displayed and a display period in which at least the inter-frame images are sequentially displayed, to be carried out.

An image processing method or a program according to one aspect of the present technology includes the step of selecting, in a case in which multiple captured images for recording are continuously captured, whether to cause black out-free live view display for sequentially displaying one of the captured images and one or multiple inter-frame images that are captured between capturing of the captured image and capturing of next captured image and that are not for recording, to be carried out, or cause black out live view display for alternately providing a backout display period in which no image is displayed and a display period in which at least the inter-frame images are sequentially displayed, to be carried out.

In one aspect of the present technology, in a case in which multiple captured images for recording are continuously captured, whether to cause black out-free live view display for sequentially displaying one of the captured images and one or multiple inter-frame images that are captured between capturing of the captured image and capturing of next captured image and that are not for recording, to be carried out, or cause black out live view display for alternately providing a backout display period in which no image is displayed and a display period in which at least the inter-frame images are sequentially displayed, to be carried out, is selected.

DESCRIPTION OF EMBODIMENTS

An embodiment to which the present technology is applied will be described below with reference to drawings.

First Embodiment

<About Present Technology>

The present technology enables appropriate live view display matching a photographing condition (scene) and the like, by switching between BOF live view display and live view display which allows a black out to occur, according to the photographing condition and the like.

First, with reference to FIG. 1, an example of general BOF live view display (black out-free live view display) at the time of continuous shooting will be described. Note that, in FIG. 1, the horizontal direction represents the chronological direction, and particularly, the right direction of the diagram indicates the future direction.

Figure 1:
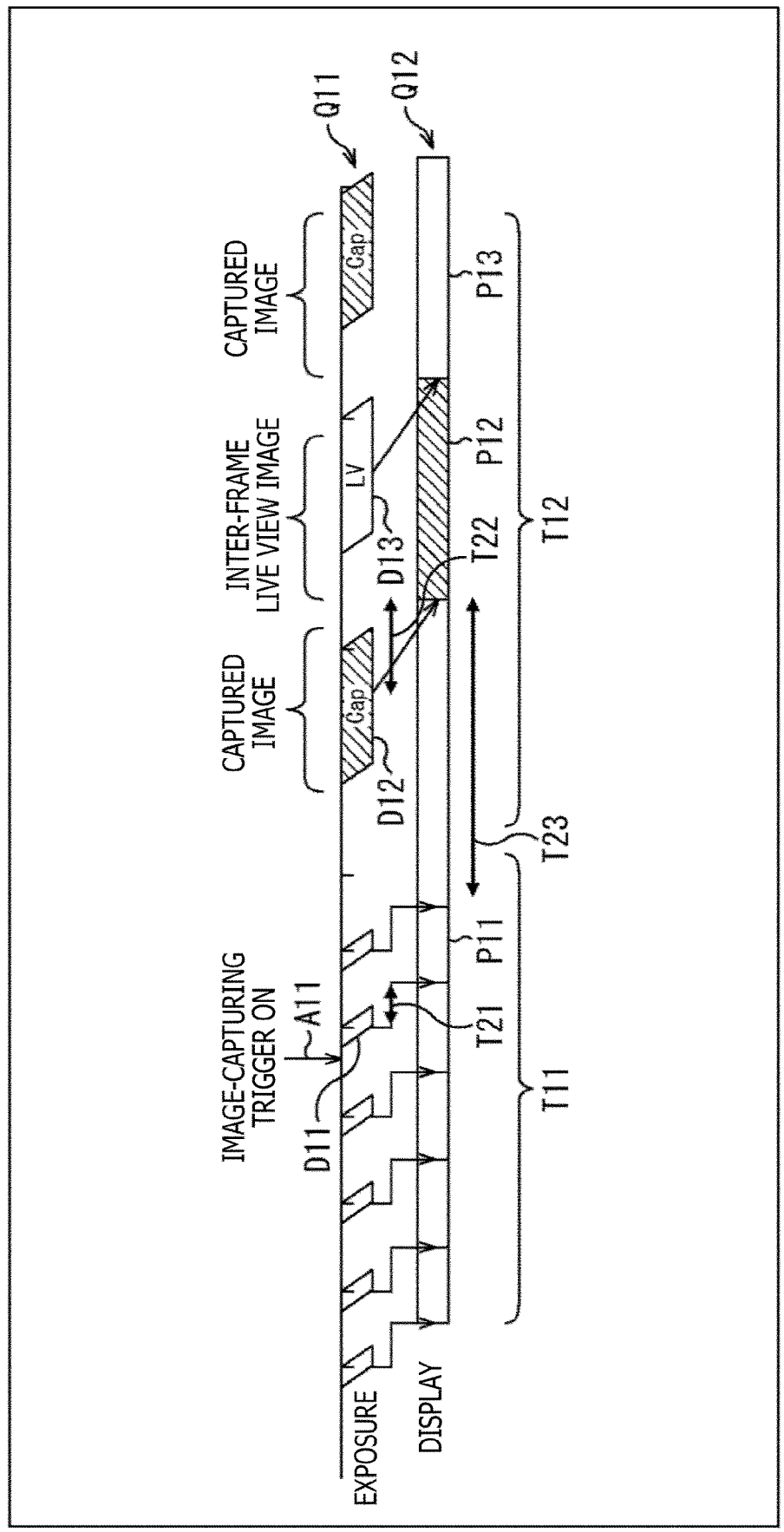
FIG. 1 is a diagram for illustrating an example of BOF live view display.

In FIG. 1, a portion indicated by an arrow Q11 represents exposure periods, and specifically, each of multiple parallelograms arranged in the horizontal direction in a drawing in the portion indicated by the arrow Q11 schematically represents an exposure period at the time when one image is captured.

Particularly, in this example, the exposure and reading of a signal are sequentially carried out on a pixel-row basis from a pixel row on an upper side to a pixel row on a lower side in an image sensor, and hence, the exposure period for each image is represented by the parallelogram. For example, in a drawing of the parallelogram representing the exposure period, an edge on the upper side represents the exposure on the first pixel row, and an edge on the lower side represents the exposure on the last pixel row.

Moreover, in FIG. 1, a portion indicated by an arrow Q12 represents a display period of each image in the live view display, and one quadrangle represents the display period of one image. Particularly, the quadrangle connected by an arrow to one parallelogram representing the exposure period indicates the display period of an image obtained by the exposure (image-capturing) in this exposure period.

In the example illustrated in FIG. 1, live view images and captured images are captured, and the live view images and the captured images are displayed in a time series (in an order of the capturing), thereby realizing the live view display.

The live view image herein is an image captured not for recoding but only for the live view display, and the live view image is not recorded in a recording section provided for a camera or the like.

For example, in FIG. 1, an exposure period D11 is an exposure period for capturing one live view image, and the live view image acquired by the exposure in the exposure period D11 is continuously displayed in a display period P11.

Moreover, the captured image is an image which is for recording and which is captured according to an instruction from a user, and the captured image is recorded in the recording section provided for the camera or the like.

For example, in FIG. 1, an exposure period D12 is an exposure period for capturing one captured image, and the captured image acquired by the exposure in the exposure period D12 is continuously displayed in a display period P12 and is simultaneously recorded in the recording section, not illustrated. In FIG. 1, characters "Cap" are marked in each of the parallelograms representing the exposure periods for the captured images.

In the continuous photographing (continuous shooting), such multiple captured images are continuously captured at a constant time interval, and the multiple captured images acquired as a result are recorded in the recording section.

Further, particularly, one of the live view images which is captured before the start of the continuous shooting of the captured images, that is, which is captured chronologically before the first captured image, is hereinafter also referred to as a pre-continuous-shooting live view image.

For example, in FIG. 1, the live view image which is acquired by the exposure in the exposure period D11 and which is continuously displayed in the display period P11 is a pre-continuous-shooting live view image.

Moreover, particularly, one of the live view images which is captured between the capturing of a captured image and the capturing of a next captured image is hereinafter also referred to as inter-frame live view image.

For example, in FIG. 1, the live view image which is acquired by the exposure in the exposure period D13 and which is continuously displayed in the display period P13 is an inter-frame live view image. In FIG. 1, characters "LV" are marked in a parallelogram representing the exposure period for the inter-frame live view image.

In this example, for example, when the camera or the like is activated, the live view display is started. That is, for example, the pre-continuous-shooting live view image is captured at a predetermined shutter speed and is displayed on the display screen at a predetermined frame rate as an image (frame) of the live view display.

The user checks an angle of view and the like while viewing the pre-continuous-shooting live view image displayed as described above, that is, the live view display, and presses a shutter button at any timing to give an instruction for the start of continuous shooting. In more details, for example, the user fully presses the shutter button to give an instruction for the start of the continuous shooting. Bringing the shutter button into the fully-pressed state is hereinafter also referred to as fully pressing the shutter button.

In this example, the instruction for the start of the continuous shooting is given by the user at a timing indicated by an arrow A11. That is, a start trigger for the continuous shooting is turned on.

When the instruction for the start of the continuous shooting is given, the camera or the like appropriately carries out processing (preparation) required to start the continuous shooting and then starts the continuous shooting, that is, the capturing of the captured images.

At the time of the continuous shooting, multiple captured images are captured at a shutter speed for the continuous shooting time, which is specified (set) by the user or the like, and continuously at a constant time interval.

In this example, particularly, the shutter speed at the capturing of the captured image is greatly reduced compared with the shutter speed at the time of the capturing of the pre-continuous-shooting live view images. In other words, an exposure period for the captured image is greatly increased compared with the exposure period for pre-continuous-shooting live view image, and the captured image is captured by means of what is called long second exposure (long-second photographed).

Note that, even after the timing indicated by the arrow A11, the pre-continuous-shooting live view images are captured and displayed in a predetermined period before the start of the exposure for the captured image. This is because, due to the preparation for the capturing and the like, the capturing of the captured image cannot be started immediately.

In this example, the pre-continuous-shooting live view image captured immediately before the first captured image is continuously displayed in a period until the first captured image is displayed.

After that, when the display of the first captured image becomes possible, the live view display is switched from the pre-continuous-shooting live view image displayed last, that is, the last frame of the pre-continuous-shooting live view image, to the first captured image.

Moreover, during the continuous shooting, after the captured image is captured, the capturing (exposure) of the inter-frame live view images is carried out before the next captured image is captured, and the acquired inter-frame live view images are displayed.

In this example, after the start of the continuous shooting, as the images of the live view display, the captured image and the inter-frame live view image are alternately displayed.

Thus, in this example, the inter-frame live view image is captured at the same shutter speed as that for the captured image. That is, the exposure period for the inter-frame live view image is set to be the same length as that for the exposure period for the captured image.

Moreover, in the period in which the captured image and the inter-frame live view image are alternately displayed, the frame rate for the live view display is defined on the basis of the shutter speed for the captured image and the inter-frame live view image.

Thus, in this example, the frame rate in the period in which the captured image and the inter-frame live view image are alternately displayed is lower than the frame rate in the period in which pre-continuous-shooting live view images are displayed. That is, the update of the live view display becomes slower.

The user moves the camera or the like according to the motion of a subject such that, for example, the subject is contained in the angle of view, while viewing the live view display at the time of the continuous shooting in the state in which the shutter button remains pressed, and releases the hand from the shutter button when the continuous shooting is to be finished.

When the BOF live view display is carried out as described above, the user can always check the subject by the live view display and can thus continuously track the subject during the continuous shooting.

However, the BOF live view display adversely affects depending on the photographing condition (scene) such as the long-second photographing as in the example illustrated in FIG. 1, and there is such a case in which the user has difficulty in tracking the subject. Accordingly, hand shake is likely to occur, and as a result, there is fear in that a captured image satisfactory for the user may not be acquired.

Specifically, the frame rate for the live view display suddenly decreases at a timing after the user presses the shutter button to give an instruction for the start of the continuous shooting. Hence, the user has difficulty in tracking the subject, and the hand shake and the like are likely to occur.

For example, in the example of FIG. 1, in a period T11 from the start of the live view display to a predetermined timing after the shutter button is pressed, the live view display is carried out at the relatively high frame rate corresponding to the shutter speed (exposure time) for the pre-continuous-shooting live view image.

However, in a period T12 after the period T11, the frame rate for the live view display greatly decreases compared with that in the period T11. That is, the update of the live view display suddenly becomes slow. This is because the frame rate for the live view display in the period T12 becomes the frame rate corresponding to the shutter speed for the captured image for which the long-second photographing is carried out.

When the frame rate changes suddenly as described above, the user has difficulty in tracking the subject on the images for the live view display, that is, has difficulty in moving the camera or the like according to a movement of the subject.

Moreover, in the example of FIG. 1, the shutter speed (exposure time) for the pre-continuous-shooting live view image and the shutter speed for the captured image are greatly different from each other. Thus, a length of time (interval) from the exposure center to the display start of the image changes. Hence, the user has difficulty in tracking the subject in the live view display, and the hand shake and the like are likely to occur.

For example, a period T21 from the center of the exposure period D11 for the pre-continuous-shooting live view image to the display start of this pre-continuous-shooting live view image, that is, the start (top) of the display period P11, is relatively short. That is, the length of time from the exposure center to the display start of the pre-continuous-shooting live view image is relatively short. Note that the center of the exposure period D11 is a center position of the parallelogram representing the exposure period D11.

Meanwhile, for example, a period T22 from a center of the exposure period D12 for the captured image to the display start of this captured image, that is, the start of a display period P12, is long. This is because the shutter speed for the captured image is slow, the exposure time thus becomes long, and consequently, the length of time from the exposure center to the display start becomes long.

As described above, also in a case in which the interval from the exposure center to the display start of the image for the live view display greatly changes, the user has difficulty in tracking the subject.

Further, the update of the live view display suddenly stops at the timing immediately after the user presses the shutter button to give an instruction for the start of the continuous shooting. Hence, the user has difficulty in tracking the subject, and the hand shake and the like are likely to occur.

For example, in the example of FIG. 1, the exposure period for the captured image is long. Hence, a period T23 from the display start of the pre-continuous-shooting live view image captured last to the display start of the first captured image is long, and the one pre-continuous-shooting live view image (for one frame) is continuously displayed in this period T23.

In other words, the update of the live view image suddenly stops immediately after the timing indicated by the arrow A11 at which the user presses the shutter button.

This is because the shutter speed for the captured image is low, an image which can be displayed in the period from the predetermined timing after the shutter button is pressed to the start of the display of the first captured image is thus only the pre-continuous-shooting live view image captured last, and the live view display cannot be updated.

As described above, in the case in which the BOF live view display is carried out, the user has difficulty in tracking the subject depending on the photographing condition and the like, and the hand shake or the like are likely to occur.

Thus, in the present technology, appropriate live view display matching the photographing condition and the like is enabled by selecting any one of the display forms, i.e., either the BOF live view display or the live view display which allows the black out to occur, according to the photographing condition.

The live view display which allows the black out to occur is particularly hereinafter also referred to as black out live view display.

Figure 2:
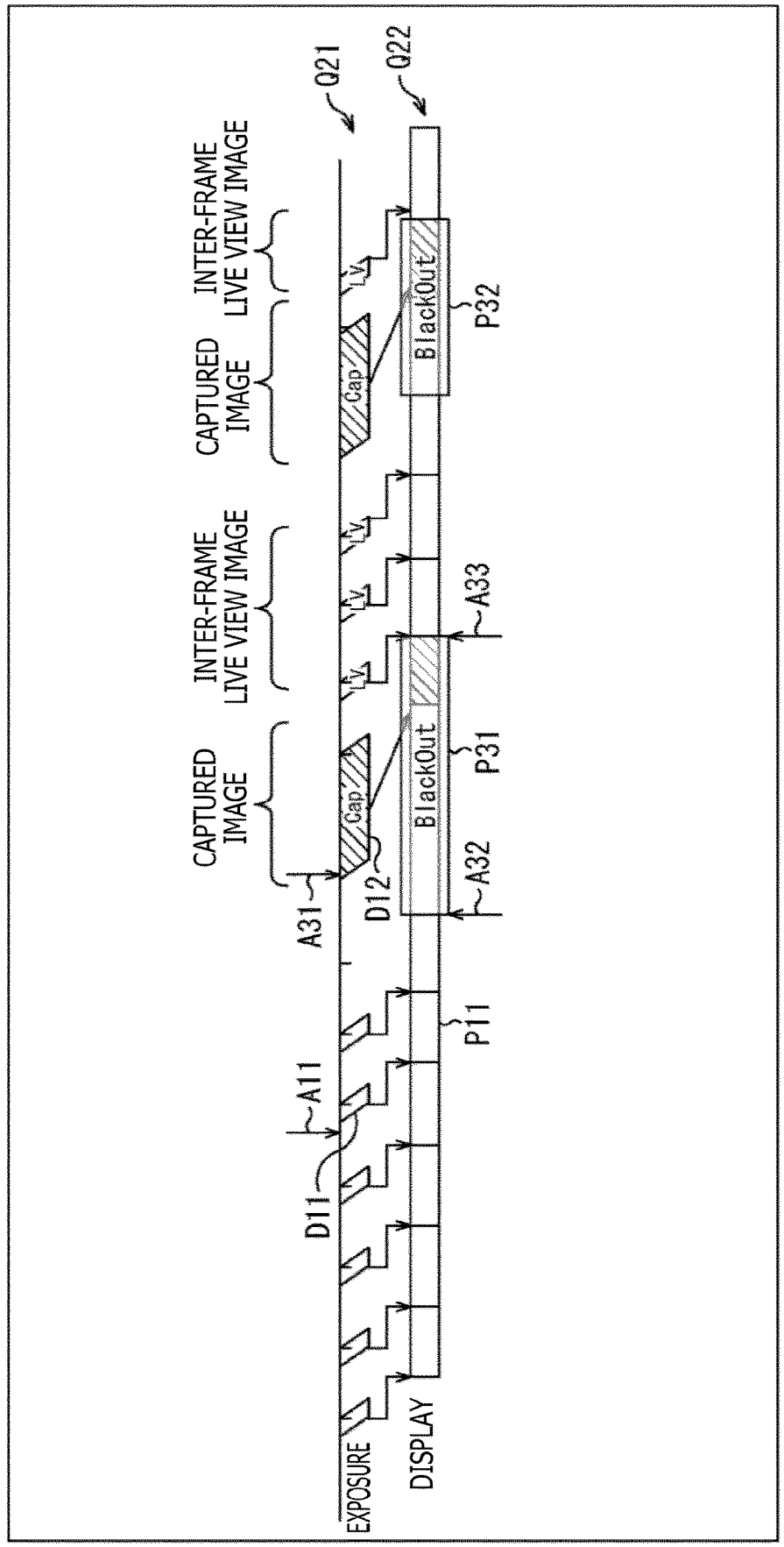
FIG. 2 is a diagram for illustrating black out live view display according to the present technology.
Figure 3:
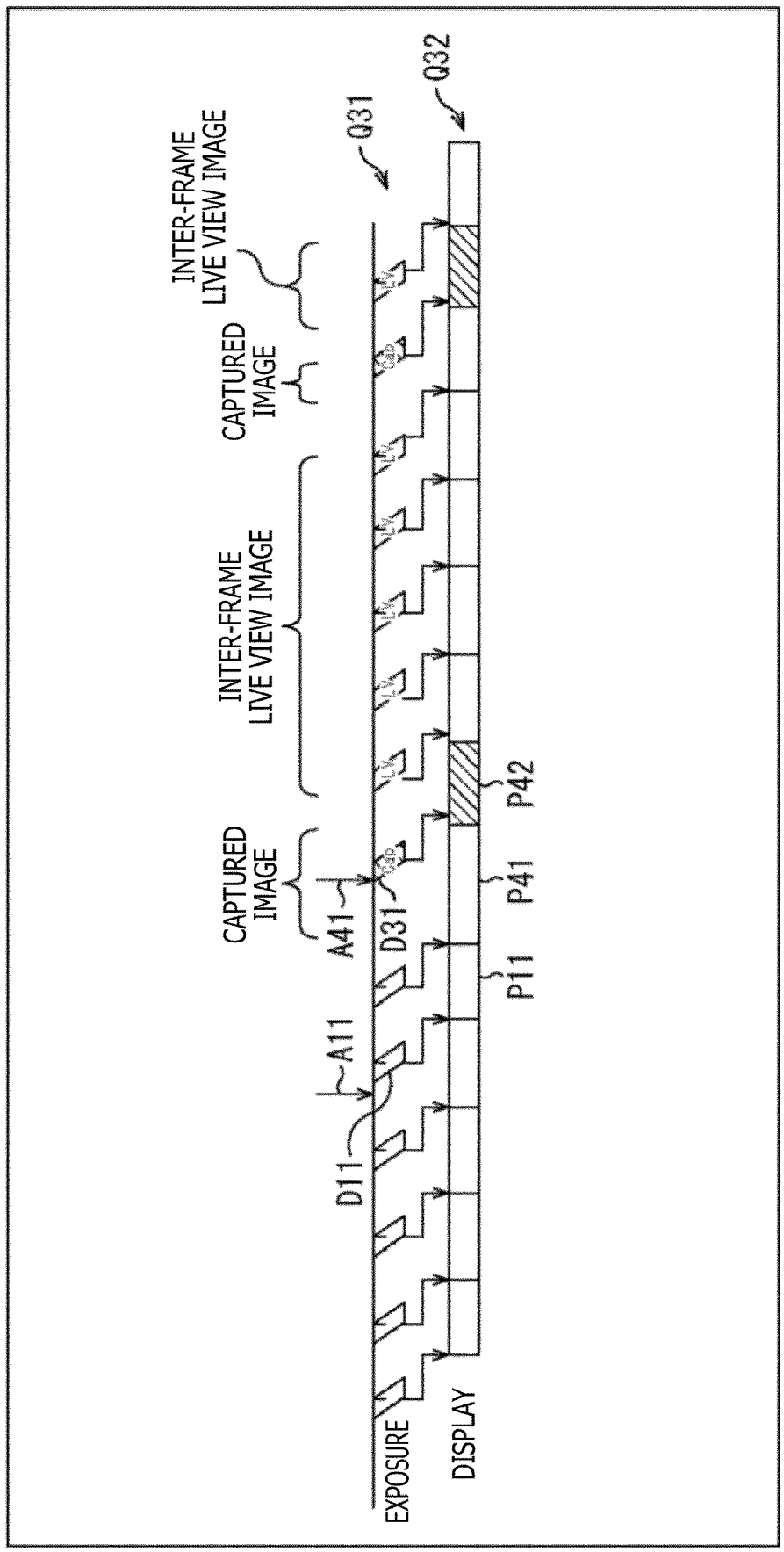
FIG. 3 is a diagram for illustrating BOF live view display according to the present technology.

With reference to FIG. 2 and FIG. 3, the BOF live view display and the black out live view display to which the present technology is applied will be described.

Note that portions in FIG. 2 and FIG. 3 corresponding to those in the case of FIG. 1 are denoted by the same reference signs, and a description thereof is appropriately omitted.

Moreover, also in FIG. 2 and FIG. 3, as in the case of FIG. 1, the exposure period for each image is represented by a parallelogram, and the display period of the image of the live view display is represented by a quadrangle. In particular, the parallelogram representing the exposure period for an image and the quadrangle representing the display period of the same image are connected by an arrow.

Of the parallelograms representing the exposure periods for the respective images, the parallelogram representing the exposure period for the captured image has the characters "Cap" marked therein, and the parallelogram representing the exposure period for the inter-frame live view image has the characters "LV" marked therein.

FIG. 2 illustrates an example of the black out live view display to which the present technology is applied.

In this black out live view display, the live view display is carried out such that a black out display period in which no image is displayed and a display period in which at least the inter-frame live view images are displayed in the order of capturing are alternately provided.

In FIG. 2, a portion indicated by an arrow Q21 represents the exposure periods for the images, and a portion indicated by an arrow Q22 represents the display period of each image in the live view display.

Also in the example of FIG. 2, when the live view display is started, the pre-continuous-shooting live view image is captured at the predetermined shutter speed, and the acquired pre-continuous-shooting live view image is displayed at the predetermined frame rate as the image for the live view display.

Then, when an instruction for the start of the continuous shooting is given by the user at the timing indicated by the arrow A11, the processing (preparation) required to start the continuous shooting is appropriately carried out, and after that, the continuous shooting, that is, the capturing of the captured images, is started at the timing indicated by the arrow A31.

In this case, when the exposure period D12 for the first captured image is long, it takes a time to display the first captured image.

Thus, when the pre-continuous-shooting live view image captured last is continuously displayed as in the example illustrated in FIG. 1, the change in the frame rate for the live view display and the like occur, and hence, the tracking of the subject becomes difficult.

Thus, in the black out live view display, after the pre-continuous-shooting live view image captured last is displayed, the display of the pre-continuous-shooting live view image is stopped at a timing indicated by an arrow A32. That is, the live view display is substantially stopped, and after that, a black out display period P31 is provided.

In this case, in the black out display period P31, there is brought about a state in which none is displayed on the display screen of the camera or the like, that is, a state of the black out display in which the display screen is black.

The timing of the start of the black out display period P31 indicated by the arrow A32 is a timing at which the pre-continuous-shooting live view image captured last has displayed for the same period as the display period for other pre-continuous-shooting live view images.

Thus, all of the pre-continuous-shooting live view images are displayed for the same display period before the start of the black out display period P31. That is, the live view display is carried out at a constant frame rate such as 120 fps or 240 fps.

Note that, in the camera or the like which carries out the live view display, the timing (time) which is indicated by the arrow A32 and at which the black out display is started can be identified on the basis of the time which is indicated by the arrow A11 and at which an instruction for the start of the continuous shooting is given by the user, that is, the shutter button is fully pressed.

That is, in the camera or the like, on the basis of the time indicated by the arrow A11, the time which is indicated by the arrow A31 and at which the exposure for the first captured image is to be started can be identified. Thus, on the basis of the time indicated by this arrow A31, an exposure start time and an exposure end time of the pre-continuous-shooting live view image captured last and a display start time of this pre-continuous-shooting live view image can be identified.

Moreover, on the basis of the display start time of this pre-continuous-shooting live view image captured last and the length of the display period of each pre-continuous-shooting live view image, that is, the frame rate for the live view display, the timing at which the black out display period P31 is to start and which is indicated by the arrow A32 can be identified.

In the camera or the like, in a period after the exposure period D12 for the first captured image until start of the exposure for a next captured image, regardless of the shutter speed for the captured image, one or multiple inter-frame live view images are captured at a high shutter speed.

In this state, the shutter speed (exposure time) of the inter-frame live view image is set to, for example, a shutter speed capable of displaying the inter-frame live view image at a frame rate equal to or higher than the predetermined frame rate such as 60 fps or higher.

In particular, in the case in which the black out live view display is carried out, the exposure period for the inter-frame live view image is set to be shorter than at least the exposure period for the captured image. In other words, the inter-frame live view image is captured at a shutter speed higher than the shutter speed for the captured image.

In the example illustrated in FIG. 2, three inter-frame live view images are captured after the exposure period D12 for the first captured image but before the start of the exposure for the next captured image. In this example, the length of the exposure period (shutter speed) for each of these inter-frame live view images is set to be the same as the exposure period for the pre-continuous-shooting live view image.

Note that an example in which the captured images are not displayed in the case in which the black out live view display is carried out is described in this embodiment.

However, the configuration is not limited to this example, and in the case in which the black out live view display is carried out, the captured image and the inter-frame live view image may be displayed at the same (constant) frame rate such as 60 fps after the black out display period. With this configuration, the black out display period can be reduced as much as possible while the frame rate for the live view display is maintained constant.

Moreover, when the first captured image is captured and multiple inter-frame live view images are further captured, the next captured image is subsequently captured.

After that, until an instruction for the end of the continuous shooting is given by the user, the processing for capturing one captured image and the processing for capturing one or multiple inter-frame live view images are alternately repeated. In other words, in a period after the exposure period for the captured image until the exposure start of the next captured image, the exposure for (capturing of) one or multiple inter-frame live view images is carried out.

During the continuous shooting of the captured images in such a way, that is, after the timing indicated by the arrow A32, as the live view display, the black out display and the display of the inter-frame live view images are alternately carried out. In other words, while the live view display of the inter-frame live view images is carried out at the constant frame rate, the periods each set to the black out display state are provided at the predetermined time interval. Note that, in FIG. 2, in a quadrangle indicating the period set to the black out display state, that is, the black out display period, characters "Black Out" are marked.

In the example of FIG. 2, the black out display period P31 is started at the timing indicated by the arrow A32 described before, the black out display period P31 is finished at the timing indicated by the arrow A33, and after that, three inter-frame live view images are sequentially displayed in display periods having the same length. That is, the inter-frame live view images are displayed at a constant frame rate such as 60 fps.

In this example, the frame rate for the inter-frame live view image is the same as the frame rate for the pre-continuous-shooting live view image. That is, in this example, in the black out live view display, the live view display of the images is carried out at the constant frame rate in the periods other than the black out display periods.

Note that the frame rate for the inter-frame live view image during the black out live view display may be the same as or different from the frame rate for the pre-continuous-shooting live view image.

Moreover, the timing of the end of the black out display period P31 indicated by the arrow A33 is a timing at which, for example, the display of the inter-frame live view image captured for the first time can be started after the end of the exposure period D12 for the captured image.

After the end of the exposure period D12 for the captured image, the live view display of all of the inter-frame live view images captured until the exposure for the next captured image is carried out, and the black out display period P32 subsequently starts. A timing of an end of this black out display period P32 is a timing at which, for example, the display of a next inter-frame live view image becomes possible.

Further, after the black out display period P32, the inter-frame live view images which are temporally continuously captured between the two captured images are displayed at the constant frame rate. Moreover, until the continuous shooting of the captured images is finished, the black out display and the live view display of the inter-frame live view images at the constant frame rate are alternately carried out.

For example, each of the black out display period P32 and the subsequent black out display periods is set to a period substantially the same as the exposure period for the captured image or the like. Similarly to the case in the first black out display period P31, the timings of the start and end of each black out display period are specified (determined) on the basis of the timing of the instruction for the start of the captured image (continuous shooting) indicated by the arrow A11, the shutter speed for the captured image, the shutter speed for the inter-frame live view image, and the like.

As described above, at the time of the continuous shooting in the present technology, the captured image and one or multiple inter-frame live view images between the captured images are alternately captured (exposed).

At this time, the captured image is captured at a shutter speed set by the user or the like. Meanwhile, the inter-frame live view image is captured not at the shutter speed for the captured image, but at the shutter speed enabling the live view display of the inter-frame live view image at the high frame rate.

Moreover, in the case in which the black out live view display is to be carried out, after the pre-continuous-shooting live view images are displayed at the constant frame rate, the black out display and the display of the inter-frame live view images at the constant frame rate are alternately carried out until the end of the continuous shooting.

Such black out live view display is particularly effective in a case in which, for example, panning is carried out at a long second exposure (long second photographing) having a relatively long exposure for a captured image, that is, at a setting having a relatively slow shutter speed and the like.

Specifically, in the case in which the continuous shooting is carried out as illustrated in FIG. 2, it is assumed that, for example, the display of the captured image at the low frame rate and the display of the inter-frame live view images at the high frame rate are alternately carried out for the live view display.

In such a case, the frame rate for the images for the live view display changes as in the example of FIG. 1. Hence, the user has difficulty in tracking the subject, and the hand shake is likely to occur.

In contrast, in the black out live view display, the display of a captured image which causes the decrease in frame rate is avoided, thereby causing the captured image to be blacked out, and only the inter-frame live view images at the high frame rate are caused to be displayed. Hence, the user is allowed to easily track the subject.

That is, in the black out live view display, the black out occurs at the constant interval, but the live view display is carried at the constant frame rate after the instruction for the continuous shooting. Thus, the user does not have difficulty in tracking the subject, and hence, the occurrence of the hand shake can be suppressed.

It is known that the motion of the subject is interpolated in the mind of the user particularly in the black out display period, and the present applicant has empirically confirmed that the subject can easily be tracked when the black out display is carried out, rather than when the captured images is displayed at a low frame rate.

Moreover, the captured image is not displayed in the black out live view display. Thus, such a state that the tracking of the subject becomes difficult due to the change in the interval from the exposure center to the display start of the image between the pre-continuous-shooting live view image and the captured image, for example, as described with reference to FIG. 1 does not occur in the black out live view display.

Further, in the black out live view display, before the first black out display, the pre-continuous-shooting live view images are displayed at the constant frame rate.

Thus, in the black out live view display, the update of the live view display does not suddenly stop as in the example of FIG. 1. Hence, the difficulty in tracking the subject does not occur, and the occurrence of the hand shake can be suppressed.

As described above, it is recognized that the black out live view display is appropriate for the continuous shooting under a photographing condition such as a condition under which the shutter speed for the captured image is relatively low, for example.

In the present technology, it is possible to select any one of the display types, i.e., either the black out live view display as described above or the BOF live view display, and to carry out the live view display of the selected type. That is, switching between the black out live view display and the BOF live view display can be carried out.

FIG. 3 illustrates an example of the BOF live view display (black out-free live view display) to which the present technology is applied.

In this BOF live view display, the pre-continuous-shooting live view images, the captured images, and the inter-frame live view images are displayed in the order of the image-capturing without the interruption of the display of the images, that is, without the provision of the black out display period. Particularly in the BOF live view display, the captured image and one or multiple inter-frame live view images captured between two successive captured images are alternately displayed.

In FIG. 3, a portion indicated by an arrow Q31 represents the exposure periods for the images, and a portion indicated by an arrow Q32 represents the display period of each image in the live view display.

Also in the example of FIG. 3, when the live view display is started, the pre-continuous-shooting live view images are captured at the predetermined shutter speed, and the acquired pre-continuous-shooting live view images are displayed at the predetermined frame rate as the images for the live view display.

Then, when an instruction for the start of the continuous shooting is given by the user at the timing indicated by the arrow A11, the processing (preparation) required to start the continuous shooting is appropriately carried out, and after that, the continuous shooting, that is, the capturing of the captured images, is started at the timing indicated by an arrow A41.

In this case, in order to achieve the BOF live view display, the pre-continuous-shooting live view image captured immediately before an exposure period D31 for the first captured image is continuously displayed in a display period P41.

Specifically, in a period after the display period P11 for the pre-continuous-shooting live view image captured for the second last time until the display of the first captured image is possible, that is, in a period until the start of a display period P42 for the captured image, the pre-continuous-shooting live view image captured for the last time is continuously displayed.

Thus, depending on the shutter speed for the captured image, the display period P41 may be longer than the display period for the other pre-continuous-shooting live view images, and hence, the frame rate for the live view display may temporarily change.

However, when a difference between the shutter speed for the captured image and the shutter speed for the pre-continuous-shooting live view image is small, a change in frame rate is accordingly small, and the user does not feel that the update of the live view display is suddenly stopped. That is, the state in which the user has difficulty to track the subject does not occur.

Moreover, in the camera or the like, in a period after the exposure period D31 for the first captured image until the start of the exposure for the next captured image, the exposure for one or multiple inter-frame live view images is carried at a high shutter speed.

That is, also in the case in which the BOF live view display is to be carried out, similarly to the case of FIG. 2, the inter-frame live view image is to be captured at a relatively high shutter speed, regardless of the shutter speed for the captured image.

Specifically, each inter-frame live view image is captured at such a shutter speed that the live view display of the inter-frame live view image can be carried out at the predetermined frame rate such as 60 fps or higher.

In the example illustrated in FIG. 3, during a period after the exposure period D31 for the first captured image until the start of the exposure for the next captured image, five inter-frame live view images are captured.

In this configuration, the length of the exposure period (shutter speed) for each inter-frame live view image is set to be the same as the length of the exposure period for the pre-continuous-shooting live view image, but the inter-frame live view image and the pre-continuous-shooting live view image may be different from each other in the length of the exposure period.

Moreover, after the first captured image is captured and the multiple inter-frame live view images are then captured, the next captured image is subsequently captured.

Then, the processing of capturing one captured image and the processing of capturing one or multiple inter-frame live view images are alternately repeated until an instruction for the end of the continuous shooting is given by the user.

As described above, during the continuous shooting of the captured image, as the live view display, the display of the captured image and the display of the one or multiple inter-frame live view images captured between the captured images are alternately carried out.

On this occasion, the captured image to be displayed functions as a preview image for checking the image which has been captured, and simultaneously functions as an image for one frame of the live view display. With this display, without providing the black out display periods, the captured images and the inter-frame live view images are continuously displayed without interruption, and the BOF live view display is consequently achieved.

Particularly in FIG. 3, after the display period P41 for the last pre-continuous-shooting live view image, the captured images and the inter-frame live view images are displayed at the constant frame rate.

Moreover, also during the entire period of the live view display, the pre-continuous-shooting live view images, the captured images, and the inter-frame live view images are displayed at the substantially constant frame rate such as 60 fps or higher, and hence, the user can easily track the subject.

Note that the frame rate for the inter-frame live view image in the BOF live view display may be the same as or different from the frame rate for the pre-continuous-shooting live view image.

As described above, during the continuous shooting according to the present technology, even in the case in which the BOF live view display is carried out, the captured image and the one or multiple inter-frame live view images are alternately captured (exposed) as in the case of the black out live view display.

At this time, the captured image is captured at the shutter speed set by the user or the like, and the inter-frame live view image is captured at a shutter speed at which the inter-frame live view images can be displayed at a high frame rate, regardless of the shutter speed for the captured images.

Moreover, in the case in which the BOF live view display is to be carried out, for example, after the pre-continuous-shooting live view images are displayed at the substantially constant frame rate, the display of the captured image and the display of the one or multiple inter-frame live view images are alternately carried out at the constant frame rate until the end of the continuous shooting.

Such BOF live view display is particularly effective in a case in which the shutter speed for the captured image is set to a relatively high speed.

Specifically, for example, in a case in which the shutter speed for the captured images is high, the captured image and the inter-frame live view image can be displayed at the same frame rate.

Thus, the user can easily track the subject without particularly carrying out the black out display, and hence, the occurrence of the hand shake and the like caused by the change in the frame rate for the live view display can be suppressed. Further, in such a case, the live view display is not interrupted when the captured image is not blacked out, and hence, the subject can more easily be tracked.

In consideration of these facts, for example, it is appreciated that the BOF live view display to which the present technology is applied is suited to the continuous shooting at a relatively high shutter speed for the captured image.

<Configuration Example of Image Processing Apparatus>

Next, an image processing apparatus to which the present technology described above is applied will be described.

The image processing apparatus can be any image processing apparatus such as a camera or a smartphone as long as the image processing apparatus includes an imaging element which can carry out the continuous shooting described above and a display device which can carry out the BOF live view display and the black out live view display to which the present technology is applied.

Figure 4:
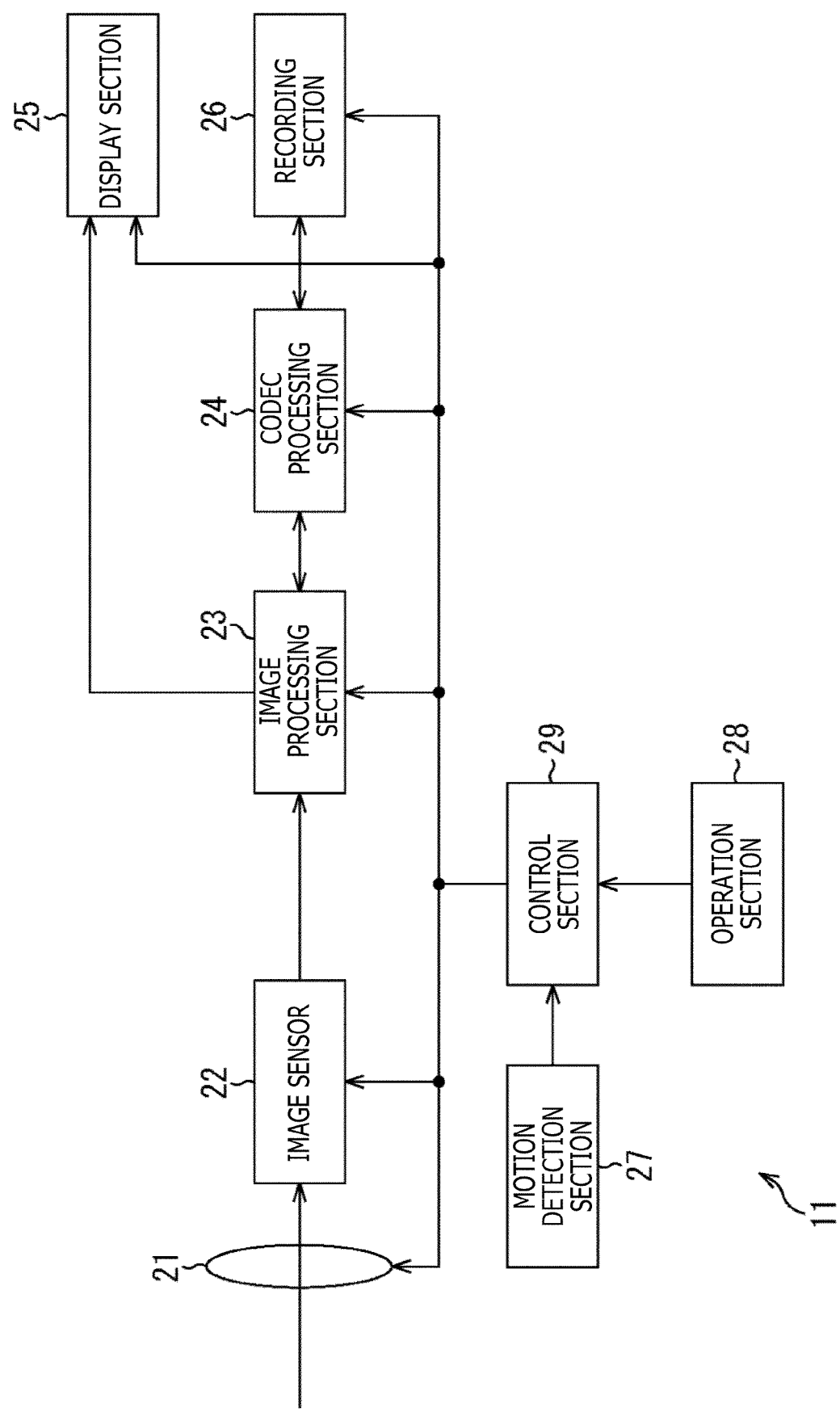
FIG. 4 is a diagram for illustrating a configuration example of an image processing apparatus.

The image processing apparatus to which the present technology is applied is configured, for example, as illustrated in FIG. 4.

An image processing apparatus 11 illustrated in FIG. 4 includes a lens section 21, an image sensor 22, an image processing section 23, a codec processing section 24, a display section 25, a recording section 26, a motion detection section 27, an operation section 28, and a control section 29.

The lens section 21 includes an optical element such as a lens, and a diaphragm, for example. The lens section 21 carries out focus adjustment and the like under the control of the control section 29, condenses the incident light, and guides the condensed light to the image sensor 22.

The image sensor 22 includes, for example, a CMOS (Complementary Metal Oxide Semiconductor). The image sensor 22 applies photoelectric conversion to the light incident from the lens section 21 under the control of the control section 29, thereby capturing an image, and supplies image data acquired consequently to the image processing section 23. That is, the image sensor 22 captures the pre-continuous-shooting live view image, the captured image, the inter-frame live view image described before and outputs image data regarding these images.

Note that an example in which the image is captured by means of the electronic shutter method will be described below, but the image-capturing method is not limited to the electronic shutter method and may be any method such as the mechanical shutter method.

The image processing section 23 applies various types of image processing such as the black level correction, the demosaic processing, and the gamma correction to the image data supplied from the image sensor 22, under the control of the control section 29, and appropriately supplies the image data to which the image processing has been applied, to the display section 25 and the codec processing section 24. Moreover, the image processing section 23 supplies the image data supplied from the codec processing section 24 to the display section 25 under the control of the control section 29.

The codec processing section 24 applies coding processing of a predetermined coding type to the image data supplied from the image processing section 23, under the control of the control section 29, and supplies the resulting image data that has subjected to the coding to the recording section 26.

Moreover, under the control of the control section 29, the codec processing section 24 reads the encoded image data from the recording section 26, decodes the encoded image data, and supplies the resulting image data that has subjected to the decoding to the image processing section 23.

The display section 25 includes, for example, a liquid crystal panel, an organic EL (Electro Luminescence) panel, or the like, and displays an image on the basis of the image data supplied from the image processing section 23, under the control of the control section 29. For example, the display section 25 displays the image on the basis of the image data supplied from the image processing section 23, thereby carrying out the live view display.

The recording section 26 records the image data supplied from the codec processing section 24, as the image data regarding the captured image which is the image captured for recording, and supplies the recorded image data to the codec processing section 24, under the control of the control section 29. Note that the recording section 26 may be attachable to and detachable from the image processing apparatus 11.

The motion detection section 27 includes, for example, an acceleration sensor. The motion detection section 27 detects the motion of the image processing apparatus 11 and supplies a detection result thereof to the control section 29.

The operation section 28 includes, for example, various buttons such as the shutter button, a switch, a dial, a touch panel, and the like. When the operation section 28 is operated by the user, the operation section 28 supplies a signal corresponding to this operation to the control section 29.

The control section 29 controls the lens section 21, the image sensor 22, the image processing section 23, the codec processing section 24, the display section 25, and the recording section 26 according to the detection result of the motion from the motion detection section 27 and the signal supplied from the operation section 28.

For example, the control section 29 selects whether to cause the display section 25 to carry out the BOF live view display or the black out live view display, in a case in which multiple captured images for the recording are to continuously be captured, and controls the display section 25 and the like according to the selection result.

<Description of Image-Capturing Processing>

Next, an operation of the image processing apparatus 11 will be described.

For example, when the image processing apparatus 11 is started and enters a state in which the image can be captured, the image processing apparatus 11 starts image-capturing processing of capturing the captured image according to the instruction from the user while carrying out the live view display.

Figure 5:
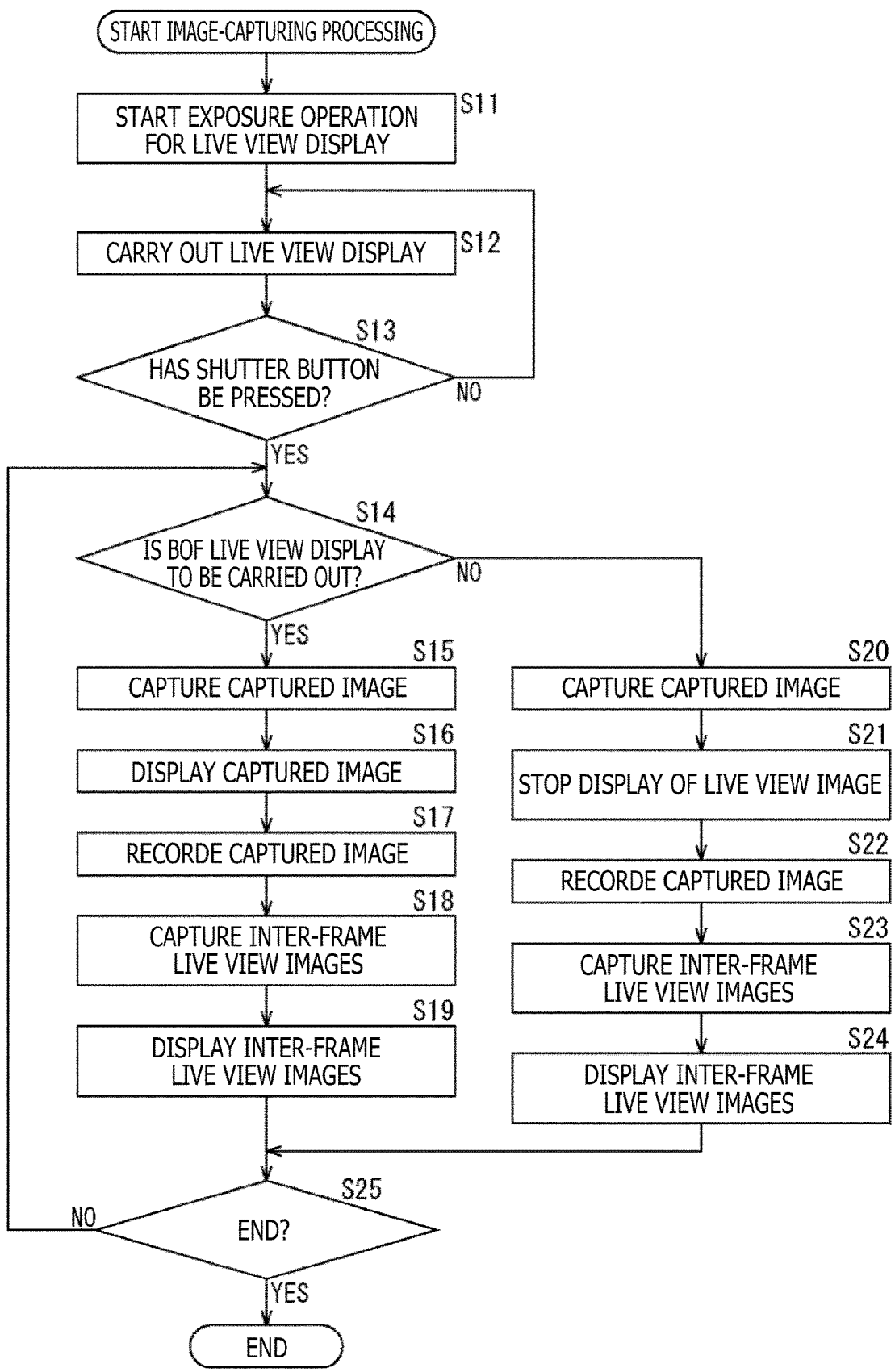
FIG. 5 is a flowchart for illustrating image-capturing processing.

With reference to a flowchart of FIG. 5, the image-capturing processing carried out by the image processing apparatus 11 will be described. Note that, in this state, it is assumed that a drive mode indicating an image-capturing method is set to "continuous shooting" for carrying out the continuous photographing in the image processing apparatus 11. That is, it is assumed that the image processing apparatus 11 continuously captures multiple captured images.

In Step S11, the control section 29 controls the lens section 21 and the image sensor 22 to start an exposure operation for the live view display.

Accordingly, the lens section 21 starts processing such as the focus adjustment under the control of the control section 29. Moreover, the image sensor 22 receives the light incident from the subject via the lens section 21 and applies the photoelectric conversion to the light under the control of the control section 29, thereby successively capturing the multiple pre-continuous-shooting live view images and supplies the obtained image data to the image processing section 23.

In this state, the control section 29 causes the image sensor 22 to capture the pre-continuous-shooting live view images at the shutter speed (exposure time) determined in advance such that the live view display of the pre-continuous-shooting live view images is achieved at the predetermined frame rate such as 120 fps or 240 fps.

In Step S12, the control section 29 controls the image processing section 23 and the display section 25 to carry out the live view display.

That is, the image processing section 23 applies, as necessary, various types of image processing to the image data regarding the pre-continuous-shooting live view images supplied from the image sensor 22, under the control of the control section 29, and supplies the image data to which the image processing has been applied, to the display section 25. Moreover, the display section 25 displays the pre-continuous-shooting live view images at the predetermined frame rate on the basis of the image data sequentially supplied from the image processing section 23, under the control of the control section 29.

When the pre-continuous-shooting live view image is displayed on the display section 25, the user checks a composition, the angle of view, and the like while viewing this pre-continuous-shooting live view image, and presses the shutter button at any timing to give an instruction for the start of the continuous shooting.

In Step S13, the control section 29 determines whether or not the shutter button has been pressed, in more details, whether or not the shutter button is brought into the fully-pressed state, on the basis of a signal supplied from the shutter button serving as the operation section 28.

In Step S13, in a case in which it is determined that the shutter has not yet been pressed, that is, the instruction for the start of the continuous shooting has not been given, the processing returns to Step S12, and the processing described above is repeated. That is, the processing of capturing the pre-continuous-shooting live view image and carrying out the live view display thereof is continuously carried out.

On the other hand, in a case in which it is determined in Step S13 that the shutter button has been pressed, that is, the instruction for the start of the continuous shooting has been given, the processing subsequently proceeds to Step S14.

Note that, in the image processing apparatus 11, even after the shutter button is pressed and the instruction for the start of the continuous shooting of the captured images is given, the capturing and the display of some pre-continuous-shooting live view images are carried out due to the timing of the preparation for the capturing of the captured image or the like.

In Step S14, the control section 29 determines whether or not the BOF live view display is to be carried out.

For example, in Step S14, it is determined whether or not the BOF live view display is to be carried out, on the basis of the shutter speed for the captured image, the shutter speed for and the number of frames (number) of the inter-frame live view images between the captured images, the detection result of the motion by the motion detection section 27, and the like. In other words, the control section 29 selects (determines) whether to execute the BOF live view display or the black out live view display.

Note that the details of the determination as to whether or not the BOF live view display is to be carried out, that is, the selection of which display type, i.e., the BOF live view display or the black out live view display, is used for the live view display, is described later.

In a case in which it is determined in Step S14 that the BOF live view display is to be carried out, the processing subsequently proceeds to Step S15, and the BOF live view display is carried out during the continuous shooting.

That is, in Step S15, the control section 29 controls the image sensor 22 to capture the captured image.

The image sensor 22 receives the light incident from the subject via the lens section 21 and applies the photoelectric conversion to the light, under the control of the control section 29, thereby capturing the captured image. Then, the image sensor 22 supplies the obtained image data to the image processing section 23.

On this occasion, the control section 29 causes the image sensor 22 to capture the captured image at a shutter speed for the continuous shooting of the captured image, the shutter speed being specified (set) by the user or determined in advance. Moreover, the time interval from the capturing of the captured image to the capturing of the next captured image is determined in advance or specified by the user, and the control section 29 causes the captured image to be captured at this time interval.

In Step S16, the control section 29 controls the image processing section 23 and the display section 25 to display the captured image captured in Step S15, as the image for the live view display.

The image processing section 23 applies required image processing to the image data regarding the captured image supplied from the image sensor 22, under the control of the control section 29, and supplies the image data to which the image processing has been applied, to the display section 25. Moreover, the image processing section 23 supplies the image data to which the image processing has been applied, also to the codec processing section 24.

The display section 25 displays the captured image on the basis of the image data supplied from the image processing section 23, under the control of the control section 29.

Note that, for example, in a case in which the first captured image is displayed during the live view display, the control section 29 causes the pre-continuous-shooting live view image captured last to be continuously displayed during the period until the first captured image can be displayed, as described with reference to FIG. 3.

In Step S17, the control section 29 controls the codec processing section 24 and the recording section 26 to record the image data associated with the captured image.

That is, the codec processing section 24 applies the coding processing to the image data associated with the captured image and supplied from the image processing section 23, under the control of the control section 29, and supplies the image data that has subjected to the coding to the recording section 26. Moreover, the recording section 26 records the image data associated with the captured image and supplied from the codec processing section 24, under the control of the control section 29.

In Step S18, the control section 29 controls the image sensor 22 to capture the inter-frame live view images.

The image sensor 22 receives the light incident from the subject via the lens section 21 and applies the photoelectric conversion to the light, under the control of the control section 29, thereby successively capturing one or multiple inter-frame live view images, and supplies the obtained image data to the image processing section 23.

On this occasion, the control section 29 causes the image sensor 22 to capture the inter-frame live view images at the predetermined shutter speed such that the inter-frame live view images can be displayed at the frame rate equal to or higher than the predetermined frame rate such as 60 fps or higher.

Note that the shutter speed at the time when the inter-frame live view image is captured may be determined in advance or may be determined by the control section 29. For example, the shutter speed at the time when the inter-frame live view image is captured may be determined on the basis of the shutter speed at the time when the captured image is captured, the time interval for capturing the captured images, the frame rate for the display of the inter-frame live view image, and the like.

Moreover, the number of the inter-frame live view images (number of frames) captured in the period from the capturing of the captured image to the capturing of the next captured image is only required to be determined by the control section 29. For example, the number of frames of the inter-frame live view image is only required to be determined on the basis of the shutter speed at the time when the captured image is captured, the time interval for capturing the captured images, the frame rate for the display of the inter-frame live view image, and the like.

In Step S19, the control section 29 controls the image processing section 23 and the display section 25 to display the inter-frame live view images.

That is, the image processing section 23 applies, as necessary, various types of image processing to the image data associated with the inter-frame live view images and supplied from the image sensor 22, under the control of the control section 29, and supplies the image data to which the image processing is applied, to the display section 25. Moreover, the display section 25 displays the inter-frame live view images at the predetermined frame rate on the basis of the image data sequentially supplied from the image processing section 23, under the control of the control section 29.

As a result, the BOF live view display described with reference to FIG. 3 is carried out, and hence, the user can check the composition, the angle of view, and the like while viewing the captured images and the inter-frame live view images to track the subject also during the continuous shooting.

When the inter-frame live view images are displayed in Step S19, the processing subsequently proceeds to Step S25.

On the other hand, in a case in which it is determined in Step S14 that the BOF live view display is not to be carried out, that is, in a case in which it is determined that the black out live view display is to be carried out, the processing subsequently proceeds to Step S20, and the black out live view display is carried out during the continuous shooting.

In Step S20, the control section 29 causes the captured image to be captured. Note that the processing in Step S20 is similar to the processing in Step S15, and hence, a description thereof is omitted.

In Step S21, the control section 29 controls the image processing section 23 and the display section 25 to stop the display the live view image.

For example, in the case in which the black out live view display illustrated in FIG. 2 is carried out, it is assumed that the first captured image is captured in Step S20 immediately before Step S21.

In this case, the control section 29 identifies the timing (time) at which the pre-continuous-shooting live view image which is captured last and which is being displayed is to be stopped, on the basis of the timing (time) at which the shutter button is fully depressed by the user to give the instruction for the start of the continuous shooting. For example, in the example illustrated in FIG. 2, the timing indicated by the arrow A32 is identified on the basis of the timing indicated by the arrow A11.

The control section 29 controls the image processing section 23 and the display section 25 to stop the display of the last pre-continuous-shooting live view image at the identified timing, thereby subsequently providing the black out display period in which the display section 25 is caused not to display the live view image, until the next inter-frame live view image can be displayed. That is, the control section 29 causes the backout display to be carried out.

Moreover, for example, also in a case in which a second or later captured image, that is, a captured image which is not captured first, is captured in Step S20 immediately before Step S21, there is carried out processing similar to that in the case in which the first captured image is captured.

In such a case, the control section 29 identifies the timing (time point) at which the display of the inter-frame live view image which has captured last and which is being displayed is to be stopped, from the timing at which an instruction for the start of the continuous shooting has been given, the exposure start time for the captured image captured in Step S20 immediately before Step 21, the shutter speeds for the captured image and the inter-frame live view image, the frame rate for the display of the inter-frame live view image, and the like.

Such a timing at which the last inter-frame live view image is to be stopped is a timing at which this last inter-frame live view image has continuously been displayed for the display period determined by the frame rate for the inter-frame live view image.

The control section 29 controls the image processing section 23 and the display section 25 to stop the display of the last inter-frame live view image at the identified timing, thereby subsequently causing the black out display to be carried out in the period until the next inter-frame live view image can be displayed.

In Step S22, the control section 29 controls the codec processing section 24 and the recording section 26 to record the image data associated with the captured image captured in Step S20. Note that the processing in Step S22 is similar to the processing in Step S17, and hence, a description thereof is omitted.

In Step S23, the control section 29 controls the image sensor 22 to capture the inter-frame live view images. In Step S24, the control section 29 controls the image processing section 23 and the display section 25 to display the inter-frame live view images.

Note that the processing in Step S23 and Step S24 is similar to the processing in Step S18 and Step S19, and hence, a description thereof is omitted. Note that, in Step S23, for example, the control section 29 causes the inter-frame live view images to be captured at the shutter speed faster than the shutter speed for the captured images.

When the processing in Step S20 to Step S24 is carried out as described above, the black out live view display described, for example, with reference to FIG. 2 is carried out. Thus, the user can check the composition, the angle of view, and the like while viewing the inter-frame live view images to track the subject also during the continuous shooting.

When the inter-frame live view images are displayed in Step S24, the processing subsequently proceeds to Step S25.

When the processing in Step S19 or Step S24 is carried out, the control section 29 determines in Step S25 whether or not the continuous shooting for the captured image is to be finished, on the basis of the signal supplied from the shutter button serving as the operation section 28.

In a case in which a state in which the shutter button is not fully pressed is brought about, it is considered that an instruction for the end of the continuous shooting is given by the user, and hence, it is determined in Step S25 that the continuous shooting is to be finished.

In a case in which it is determined in Step S25 that the continuous shooting is not to be finished, the processing returns to Step S14, and the processing described above is repeated.

In this case, in a case in which the BOF live view display is determined to be carried out for the first time in Step S14, the BOF live view display is continuously determined to be carried out in Step S14 subsequently. That is, in a case in which the BOF live view display is selected as the live view display, the BOF live view display is continuously carried out until the continuous shooting for the captured images is finished.

Similarly, in a case in which the BOF live view display is determined not to be carried out for the first time in Step S14, the BOF live view display is continuously determined not to be carried out in Step S14 subsequently, and the black out live view display is continuously carried out.

Moreover, in a case in which the continuous shooting is determined to be finished in Step S25, the control section 29 stops the processing carried out in each section of the image processing apparatus 11, and hence, the image-capturing processing is finished.

The image processing apparatus 11 appropriately selects either the BOF live view display or the black out live view display and continuously shoots the captured images while carrying out the live view display of the selected display type as described above.

With this configuration, appropriate live view display matching the photographing condition and the like can be carried out. That is, for example, a flexible response can be made to a scene for which the BOF live view display is effective, a scene for which the BOF live view is not effective, and the like.

<About Selection of Display Type>

Next, the processing in Step S14 in the image-capturing processing of FIG. 5 described above, that is, the selection of the display type of the live view display, will be described.

Whether to carry out the BOF live view display or the black out live view display as the live view display can be determined (selected) on the basis of, for example, the frame rate for the live view display, the exposure time for the captured image, and the exposure time for the inter-frame live view image.

For example, it is assumed that the frame rate for the display at the time when the live view display, that is, the BOF live view display or the black out live view display, is carried out is a fixed frame rate such as 60 pfs.

In this case, the number of frames for the live view display corresponding to the exposure time for the image, that is, the number of frames which are for the live view display and which are displayed in a period having the same length as the exposure time, is referred to as exposure frame number. The exposure frame number can be obtained from the exposure time for the image, that is, the shutter speed, and the frame rate for the live view display.

For example, in a case in which the exposure time for the one captured image is the same as a display time for two frames of the live view display, the exposure frame number of the captured image is "2."

In the control section 29, whether to carry out the BOF live view display or the black out live view display can be selected by comparing between the exposure frame number of the captured image and the exposure frame number of the inter-frame live view image.

Figure 6:
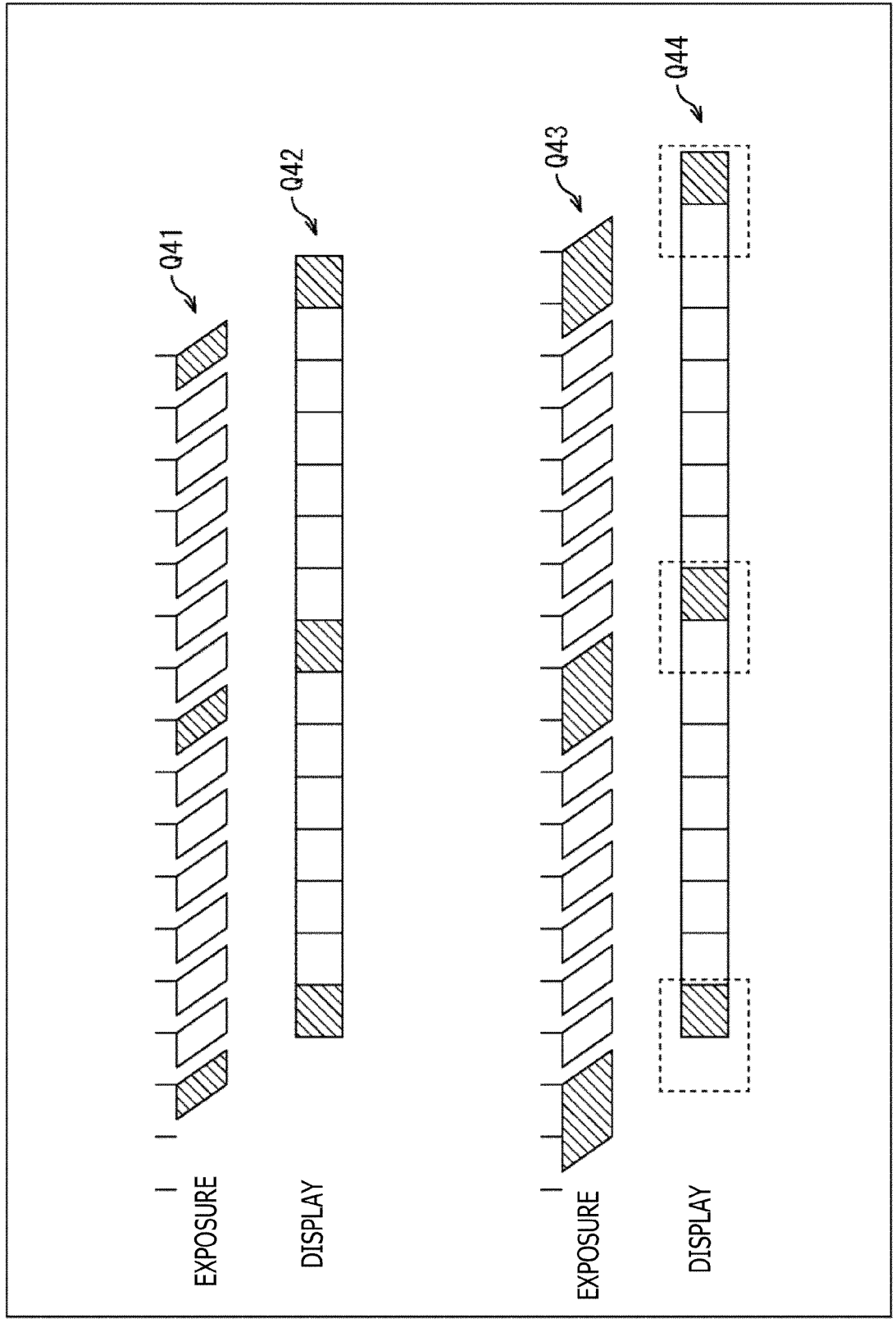
FIG. 6 is a diagram for illustrating selection of a display type for the live view display.

Specifically, for example, the control section 29 selects the BOF live view display in a case in which the exposure frame number of the captured image is equal to or smaller than the exposure frame number of the inter-frame live view image as illustrated on an upper side of FIG. 6.

Conversely, the control section 29 selects the black out live view display in a case in which the exposure frame number of the captured image is larger than the exposure frame number of the inter-frame live view image as illustrated on a lower side of FIG. 6.

Note that, in FIG. 6, the horizontal direction represents the chronological direction, and in FIG. 6, as in the case of FIG. 1, the exposure period for each image is represented by a parallelogram, and the display period of the image of the live view display is represented by a quadrangle.

Particularly in FIG. 6, parallelograms and quadrangles with diagonal lines (hatching) represent the exposure periods and the display periods of the captured images, respectively, and parallelograms and quadrangles without the diagonal lines represent the exposure periods and the display periods of the inter-frame live view images, respectively. Further, in FIG. 6, it is assumed that the frame rate for the live view display is 60 pfs.

In FIG. 6, in the example on the upper side, a portion indicated by an arrow Q41 represents the exposure periods for the captured images and the inter-frame live view images, and a portion indicated by an arrow Q42 represents the display period of each image in the live view display.

In this example, the exposure frame number of the captured image and the exposure frame number of the inter-frame live view image are each "1." That is, the exposure frame number of the captured image is equal to or smaller than the exposure frame number of the inter-frame live view image.

Thus, when the captured images and the inter-frame live view images, which are captured, are sequentially displayed, the live view display can be carried out at 60 pfs.

Thus, the control section 29 selects the BOF live view display in a case in which the exposure frame number of the captured image is equal to or smaller than the exposure frame number of the inter-frame live view image.

Meanwhile, in FIG. 6, in the example on the lower side, a portion indicated by an arrow Q43 represents the exposure periods for the captured images and the inter-frame live view images, and a portion indicated by an arrow Q44 represents the display period of each image in the live view display.

In this example, the exposure frame number of the captured image is "2." That is, an exposure time corresponding to a display period for two frames of the live view display is required to capture one captured image.

However, the exposure frame number of the inter-frame live view image is "1" as that in the example on the upper side in the drawing.

Thus, in this example, the exposure frame number of the captured image is larger than the exposure frame number of the inter-frame live view image.

Thus, even when the BOF live view display is to be carried out at 60 pfs, the inter-frame live view image for one frame to be displayed immediately before the captured image cannot be captured.

That is, images to be displayed when the live view display is carried out at 60 pfs are illustrated in the portion indicated by the arrow Q44, but the exposure frame number of the captured images is "2," and the inter-frame live view image immediately before the captured image in each of periods enclosed by dotted lines cannot actually be captured.

Thus, the control section 29 selects the black out live view display in a case in which the exposure frame number of the captured image is larger than the exposure frame number of the inter-frame live view image.

In this case, the control section 29 sets the periods enclosed by the dotted lines in the portion indicated by the arrow Q44, to the black out display periods, thereby avoiding the display of the images while carrying out the live view display at 60 pfs for the inter-frame live view images actually captured.

This black out display period is set to, for example, a period which includes the period in which the captured image is displayed when the black out is not carried out, and which has a length corresponding to the exposure frame number of the captured image or the like.

The inter-frame live view images can be displayed at 60 pfs in the periods other than the black out display periods by carrying out such black out live view display.

There has been described above the example in which the control section 29 selects the display type of the live view display by obtaining the exposure frame numbers of the captured image and the inter-frame live view image on the basis of the shutter speeds for the captured image and the inter-frame live view image and comparing the obtained exposure frame numbers with each other.

However, the selection of the display type of the live view display is not limited to this example. It is also possible to carry out processing equivalent to the case described above in which the exposure frame numbers are compared with each other, that is, the selection of the display type of the live view display, by comparing the shutter speed for the captured image and the shutter speed for the inter-frame live view image while assuming that the captured image and the inter-frame live view image are different from each other in exposure frame number.

In such a case, the control section 29 selects the black out live view display in a case in which the shutter speed for the captured image is slower than the shutter speed for the inter-frame live view image. On the other hand, the control section 29 selects the BOF live view display in a case in which the shutter speed for the captured image is equal to or lower than the shutter speed for the inter-frame live view image.

Note that, for example, the control section 29 may select the black out live view display in a case in which the shutter speed for the captured image is higher than a predetermined threshold value or in a case in which a difference in shutter speed between the captured image and the inter-frame live view image is equal to or larger than a predetermined value.

Moreover, the control section 29 may adjust the shutter speed for the captured image within a range in which the exposure frame number does not change, in a case in which the exposure frame numbers of the captured image and the inter-frame live view image are the same (for example, "1").

In addition, the control section 29 may select the display type of the live view image on the basis of a detection result of the motion by the motion detection section 27 or a photographing mode specified on a menu or the like by the user operating the operation section 28.

Specifically, for example, the control section 29 identifies a photographing operation made by the user, such as the panning, on the basis of the detection result of the motion supplied from the motion detection section 27. For example, the control section 29 assumes that the panning is being carried out as the photographing operation, in a case in which the image processing apparatus 11 is moving in the horizontal direction as time elapses.

After that, the control section 29 selects the black out live view display in a case in which the control section 29 has identified that the specific motion of the image processing apparatus 11, that is, a predetermined specific photographing operation such as the panning, is being carried out. On the other hand, the control section 29 selects the BOF live view display in a case in which the specific photographing operation is not being carried out.

Note that, in a case in which the specific motion is detected as the motion of the image processing apparatus 11, that is, in a case in which it is identified that the specific photographing operation such as the panning is being carried out, for example, the display type of the live view display may be selected on the basis of the shutter speeds for the captured image and the inter-frame live view image and the like as described with reference to FIG. 6. In this case, for example, the BOF live view display is selected as the display type of the live view display, for example, when the specific photographing operation is not being carried out.

Moreover, for example, the control section 29 may select the display type of the live view display on the basis of the photographing mode specified by the user or the like, an instruction (instruction input) input by the user operating the operation section 28, or the like.

Specifically, the control section 29 selects the black out live view display, for example, in a case in which a specific photographing mode such as a panning mode is specified or in a case in which such setting that the BOF live view display is turned off is explicitly specified by an instruction from the user, such as mode switching.

In such a case, for example, the control section 29 selects the BOF live view display in a case in which a photographing mode other than the specific photographing modes is specified or in a case in which such setting that the BOF live view display is turned on is explicitly specified by an instruction input by the user.

Note that, in a case in which the specific photographing mode such as the panning mode is specified, for example, the control section 29 may select the display type of the live view display on the basis of the shutter speeds for the captured image and the inter-frame live view image or the like as described with reference to FIG. 6. In this case, for example, when the specific photographing mode is not specified, the control section 29 selects the BOF live view display as the display type of the live view display.

<Configuration Example of Computer>

Incidentally, the series of processing described above may be carried out by hardware or may be carried out by software. In a case in which the series of processing is carried out by the software, a program forming this software is installed on the computer. In this state, the compute includes a computer built into dedicated hardware and, for example, a general-purpose personal computer which can carry out various functions by installing various programs.

Figure 7:
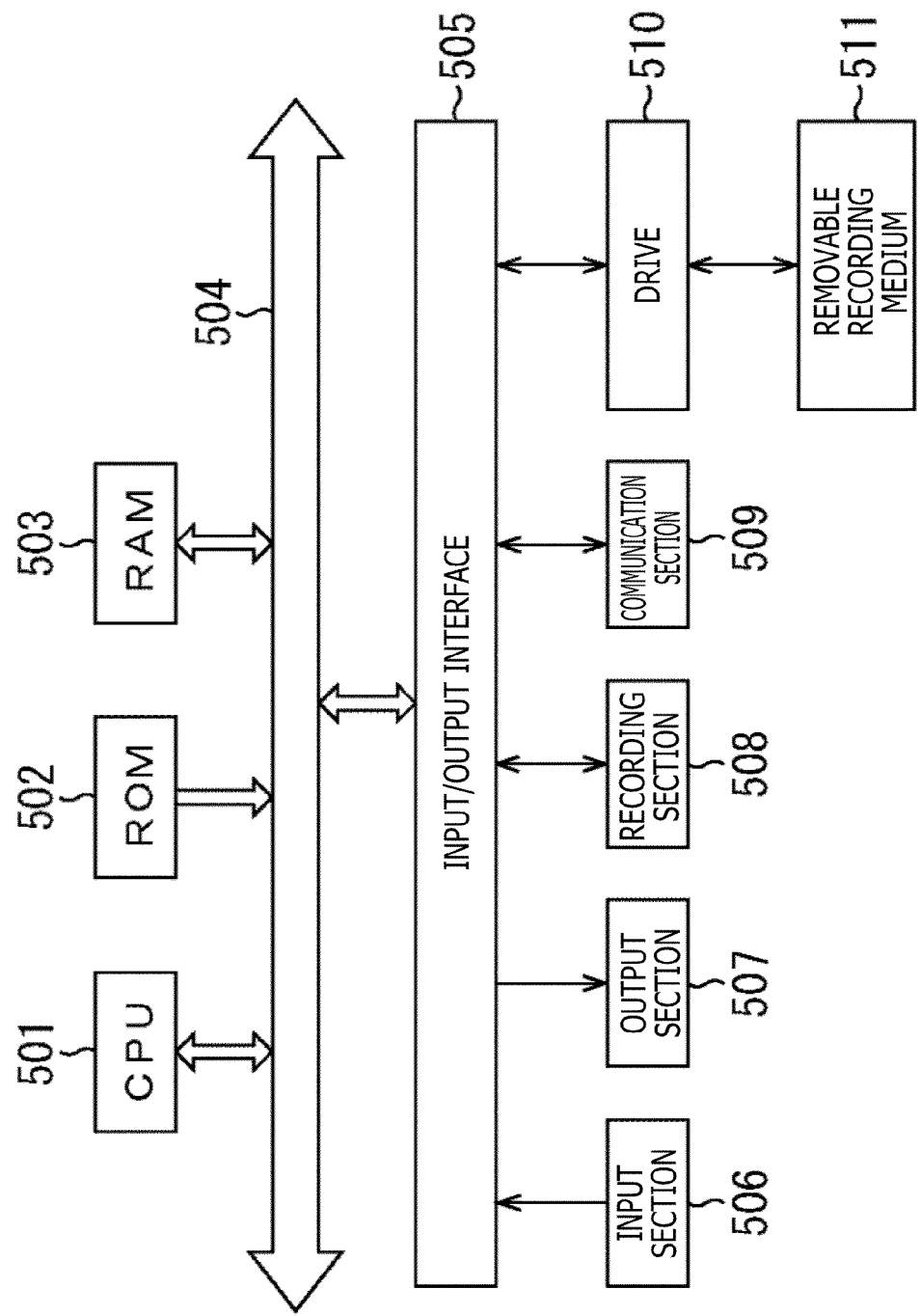
FIG. 7 is a diagram for illustrating a configuration example of a computer.

FIG. 7 is a block diagram for illustrating a configuration example of hardware of a computer which carries out the series of processing described above through a program.

In the computer, a CPU (Central Processing Unit) 501, a ROM (Read Only Memory) 502, and a RAM (Rando Access Memory) 503 are connected to one another via a bus 504.

To the bus 504, an input/output interface 505 is further connected. To the input/output interface 505, an input section 506, an output section 507, a recording section 508, a communication section 509, and a drive 510 are connected.

The input section 506 includes a button, a switch, a touch panel, a keyboard, a mouse, a microphone, an imaging element, and the like. The output section 507 includes a display, a speaker, and the like. The recording section 508 includes a hard disk, a nonvolatile memory, and the like. The communication section 509 includes a network interface and the like. The drive 510 drives a removable recording medium 511 such as a magnetic disk, an optical disc, a magneto-optic disk, or a semiconductor memory.

In the computer as described above, the series of processing described above is carried out by, for example, the CPU 501 loading a program recorded in the recording section 508 on the RAM 503 via the input/output interface 505 and the bus 504.

The program to be executed by the computer (CPU 501) can be, for example, recorded in the removable recording medium 511 as a packaged media and can then be provided. Moreover, the program can be provided via a wired or wireless transmission medium such as a local area network, the Internet, and digital satellite broadcast.

In the computer, the program can be installed in the recording section 508 via the input/output interface 505 by mounting the removable recording medium 511 to the drive 510. Moreover, the program can be received by the communication section 509 via a wired or wireless transmission medium and can be installed in the recording section 508. Otherwise, the program can be installed, in advance, in the ROM 502 or the recording section 508.

Note that the program executed by the computer may be a program in which processing is carried out as a time series along the sequence described in the present specification, or may be a program in which processing is carried out in parallel or at a required timing such as a timing at which a call is made.

Moreover, an embodiment of the present technology is not limited to the embodiment described above and may be changed in various manners within a scope that does not deviate from the gist of the present technology.

For example, the present technology can have a configuration of the cloud computing in which one function is divided among and processed in cooperation by multiple apparatuses via a network.

Moreover, each step described in the flowchart described above may not only be carried out by one apparatus, but also be divided among and carried out by multiple apparatuses.

Further, in a case in which multiple pieces of processing are included in one step, the multiple pieces of processing included in the one step may not only be carried out by one apparatus, but also be divided among and carried out by multiple apparatuses.

Further, the present technology can also take the following configurations.

(1)
An image processing apparatus including:
a control section configured to select, in a case in which multiple captured images for recording are continuously captured, whether to
cause black out-free live view display for sequentially displaying one of the captured images and one or multiple inter-frame images that are captured between capturing of the captured image and capturing of next captured image and that are not for recording, to be carried out, or
cause black out live view display for alternately providing a backout display period in which no image is displayed and a display period in which at least the inter-frame images are sequentially displayed, to be carried out.

(2)
The image processing apparatus according to (1) above, in which the control section causes the inter-frame image to be captured at such a shutter speed that the inter-frame image is able to be displayed at a frame rate equal to or higher than a predetermined frame rate.

(3)
The image processing apparatus according to (2) above, in which the predetermined frame rate is 60 fps.

(4)
The image processing apparatus according to (1) above, in which the control section causes the inter-frame image to be captured at a shutter speed higher than a shutter speed for the captured image, in a case in which the black out live view display is carried out.

(5)
The image processing apparatus according to any one of (1) to (4) above, in which the control section selects whether to cause the black out-free live view display to be carried out or cause the black out live view display to be carried out, on the basis of a shutter speed for the captured image and a shutter speed for the inter-frame image.

(6)
The image processing apparatus according to (5) above, in which the control section makes the selection on the basis of the number of frames displayed in a period having the same length as an exposure time for the captured image and the number of frames displayed in a period having the same length as an exposure time for the inter-frame image, in a case in which the black out-free live view display or the black out live view display is carried out at a predetermined frame rate.

(7)
The image processing apparatus according to (6) above, in which the control section selects the black out live view display in a case in which the number of frames displayed in the period having the same length as the exposure time for the captured image is larger than the number of frames displayed in the period having the same length as the exposure time for the inter-frame image.

(8)
The image processing apparatus according to (5) above, in which the control section selects the black out live view display in a case in which the shutter speed for the captured image is lower than the shutter speed for the inter-frame image.

(9)
The image processing apparatus according to any one of (5) to (8) above, in which the control section makes the selection on the basis of the shutter speed for the captured image and the shutter speed for the inter-frame image in a case in which a specific photographing mode is specified.

(10)

The image processing apparatus according to any one of (1) to (4) above, in which the control section selects whether to cause the black out-free live view display to be carried out or cause the black out live view display to be carried out, on the basis of a detection result of a motion of the image processing apparatus.

(11)

The image processing apparatus according to (10) above, in which the control section makes the selection on the basis of a shutter speed for the captured image and a shutter speed for the inter-frame image in a case in which a specific motion is detected as the motion of the image processing apparatus.

(12)

The image processing apparatus according to any one of (1) to (4) above, in which the control section selects whether to cause the black out-free live view display to be carried out or cause the black out live view display to be carried out, on the basis of a specified photographing mode or an instruction input by a user.

(13)

The image processing apparatus according to any one of (1) to (12) above, in which the control section identifies a timing of starting the black out display period, on the basis of a timing at which an instruction for start of capturing the captured image is given, to cause the black out live view display to be carried out.

(14)

An image processing method including:
by an image processing apparatus,
selecting, in a case in which multiple captured images for recording are continuously captured, whether to
cause black out-free live view display for sequentially displaying one of the captured images and one or multiple inter-frame images that are captured between capturing of the captured image and capturing of next captured image and that are not for recording, to be carried out, or
cause black out live view display for alternately providing a backout display period in which no image is displayed and a display period in which at least the inter-frame images are sequentially displayed, to be carried out.

(15)

A program for causing a computer to carry out processing including the step of:
selecting, in a case in which multiple captured images for recording are continuously captured, whether to
cause black out-free live view display for sequentially displaying one of the captured images and one or multiple inter-frame images that are captured between capturing of the captured image and capturing of next captured image and that are not for recording, to be carried out, or
cause black out live view display for alternately providing a backout display period in which no image is displayed and a display period in which at least the inter-frame images are sequentially displayed, to be carried out.

REFERENCE SIGNS LIST

11: Image processing apparatus
21: Lens section
22: Image sensor
23: Image processing section
24: Codec processing section
25: Display section
26: Recording section
27: Motion detection section
28: Operation section
29: Control section

The invention claimed is:

1. An image processing apparatus, comprising:
a central processing unit (CPU) configured to:
select, in a case in which a plurality of multiple captured images for recording are continuously captured, whether to perform a black out-free live view display or to perform a black out live view display, based on a shutter speed for at least one of the plurality of captured images and a shutter speed of at least one of a plurality of inter-frame images, wherein
the black out-free live view display sequentially displays at least one of the plurality of captured images and at least one of the plurality of inter-frame images,
the plurality of inter-frame images are captured between a capturing operation of a first captured image and a capturing operation of a second captured image,
the first captured image and the second captured image are not for a recording operation, and
the black out live view display for alternately provides a backout display period in which no image is displayed and a display period in which at least one of the plurality of inter-frame images are sequentially displayed.

2. The image processing apparatus according to claim 1, wherein the CPU is further configured to cause the at least one of the plurality of inter-frame images to be captured at the shutter speed such that the at least one of the plurality of inter-frame images is able to be displayed at a frame rate equal to or higher than a specific frame rate.

3. The image processing apparatus according to claim 2, wherein the specific frame rate is 60 fps.

4. The image processing apparatus according to claim 1, wherein the CPU is further configured to cause, in the black out live view display, the at least one of the plurality of inter-frame images to be captured at the shutter speed higher than the shutter speed for the at least one of the plurality of captured images.

5. The image processing apparatus according to claim 1, wherein the selection is based on a number of frames displayed in a period having a same length as an exposure time for the plurality of captured images and a number of frames displayed in a period having a same length as an exposure time for the plurality of inter-frame images.

6. The image processing apparatus according to claim 5, wherein the CPU is further configured to select the black out live view display in a case in which the number of frames displayed in the period having the same length as the exposure time for the plurality of captured images is larger than the number of frames displayed in the period having the same length as the exposure time for the plurality of inter-frame images.

7. The image processing apparatus according to claim 1, wherein the CPU is further configured to select the black out live view display in a case in which the shutter speed for the at least one of the plurality of captured images is lower than the shutter speed for the at least one of the plurality of inter-frame images.

8. The image processing apparatus according to claim 1, wherein
the CPU is further configured to specify a specific photographing mode, and
the selection is based on the shutter speed for the at least one of the plurality of captured images and the shutter speed for the at least one of the plurality of inter-frame images, in a case in which the specific photographing mode is specified.

9. The image processing apparatus according to claim 1, wherein the CPU is further configured to select whether to perform the black out-free live view display or to perform the black out live view display, based on a motion of the image processing apparatus.

10. The image processing apparatus according to claim 9, wherein the selection is based on the shutter speed for the plurality of captured images and the shutter speed for the plurality of inter-frame images, in a case in which a specific motion is the motion of the image processing apparatus.

11. The image processing apparatus according to claim 1, wherein the CPU is further configured to:
specify a photographing mode; and
select whether to perform the black out-free live view display or to perform the black out live view display, based on the specified photographing mode or an instruction input by a user.

12. The image processing apparatus according to claim 1, wherein the CPU is further configured to identify, in the black out live view display, a timing to start the black out display period, based on a timing at which an instruction is provided to start a capturing operation of the at least one of the plurality of captured images.

13. An image processing method, comprising:
by an image processing apparatus:
selecting, in a case in which a plurality of captured images for recording are continuously captured, whether to perform a black out-free live view display or to perform a black out live view display, based on a shutter speed for at least one of the plurality of captured images and a shutter speed of at least one of a plurality of inter-frame images, wherein
the black out-free live view display sequentially displays at least one of the plurality of captured images and at least one of the plurality of inter-frame images,
the plurality of inter-frame images are captured between a capturing operation of a first captured image and a capturing operation of a second captured image,
the first captured image and the second captured image are not for a recording operation, and
the black out live view display for alternately provides a backout display period in which no image is displayed and a display period in which at least one of the plurality of inter-frame images are sequentially displayed.

14. A non-transitory computer-readable medium having stored thereon, computer-executable instructions which, when executed by a computer, cause the compute to execute operations, the operations comprising:
selecting, in a case in which a plurality of captured images for recording are continuously captured, whether to perform a black out-free live view display or to perform a black out live view display, based on a shutter speed for at least one of the plurality of captured images and a shutter speed of at least one of a plurality of inter-frame images, wherein
the black out-free live view display sequentially displays at least one of the plurality of captured images and plurality of one inter-frame images,
the plurality of inter-frame images are captured between a capturing operation of a first captured image and a capturing operation of a second captured image,
the first captured image and the second captured image are not for a recording operation, and
the black out live view display for alternately provides a backout display period in which no image is displayed and a display period in which at least one of the plurality of inter-frame images are sequentially displayed.

* * * * *